United States Patent
Schael et al.

(10) Patent No.: US 8,408,854 B2
(45) Date of Patent: Apr. 2, 2013

(54) CONNECTION INSERT

(75) Inventors: Oliver Schael, Kirchlengern (DE); Eyyahi Dincdemir, Herford (DE)

(73) Assignee: Hettich-Heinze GmbH & Co. KG, Spenge (DE)

( * ) Notice: Subject to any disclaimer, the term of this patent is extended or adjusted under 35 U.S.C. 154(b) by 0 days.

(21) Appl. No.: 13/299,939

(22) Filed: Nov. 18, 2011

(65) Prior Publication Data

US 2012/0107068 A1    May 3, 2012

Related U.S. Application Data

(62) Division of application No. 11/910,763, filed as application No. PCT/EP2006/061394 on Apr. 6, 2006, now Pat. No. 8,079,794.

(30) Foreign Application Priority Data

Apr. 7, 2005    (DE) .................. 20 2005 005 579 U

(51) Int. Cl.
 *F16B 1/00*    (2006.01)
(52) U.S. Cl. .......... 411/82.1; 411/82; 411/258; 411/930
(58) Field of Classification Search .................. 411/23, 411/82–82.3, 258, 930; 52/787.1; 405/259.4, 405/259.5, 259.6
See application file for complete search history.

(56) References Cited

U.S. PATENT DOCUMENTS

| | | | |
|---|---|---|---|
| 2,462,822 A | 2/1949 | Wood | |
| 3,019,865 A | 2/1962 | Rohe | |
| 3,196,529 A | 7/1965 | Schwinghamer | |
| 3,197,854 A | 8/1965 | Rohe | |
| 4,063,582 A | 12/1977 | Fischer et al. | |
| 4,094,222 A * | 6/1978 | Lang et al. | 411/15 |
| 4,820,095 A * | 4/1989 | Mraz | 411/82.3 |
| 4,836,729 A * | 6/1989 | Bisping et al. | 411/82.1 |
| 4,893,974 A | 1/1990 | Fischer et al. | |
| 4,973,208 A | 11/1990 | Gauron | |
| 5,085,547 A * | 2/1992 | Vanotti | 411/72 |
| 5,093,957 A | 3/1992 | Do | |
| 5,249,899 A | 10/1993 | Wilson | |
| 5,378,099 A | 1/1995 | Gauron | |
| 5,544,980 A | 8/1996 | Seegmiller | |
| 5,653,563 A * | 8/1997 | Ernst et al. | 411/82 |
| 5,669,199 A | 9/1997 | Ludwig et al. | |
| 6,017,176 A | 1/2000 | Marui | |
| 6,203,114 B1 * | 3/2001 | Ehrlich | 301/124.1 |
| 6,484,471 B2 * | 11/2002 | Steed et al. | 52/704 |
| 6,604,899 B2 | 8/2003 | Kubler et al. | |
| 6,705,804 B2 * | 3/2004 | Dierker | 405/259.5 |
| 2002/0094240 A1 * | 7/2002 | Cook | 405/259.4 |

FOREIGN PATENT DOCUMENTS

| | | |
|---|---|---|
| DE | 25 15 950 | 10/1976 |
| FR | 27 01 071 | 8/1994 |

* cited by examiner

*Primary Examiner* — Roberta Delisle
(74) *Attorney, Agent, or Firm* — Barnes & Thornburg LLP

(57) ABSTRACT

A connection insert includes a central adhesive supply channel and outlets which are perpendicular to the channel. The connection insert consists of a plurality of parts, and comprises an inner part provided with the adhesive supply channel and an outer sleeve that can be at least partially inserted into a borehole of a component.

8 Claims, 8 Drawing Sheets

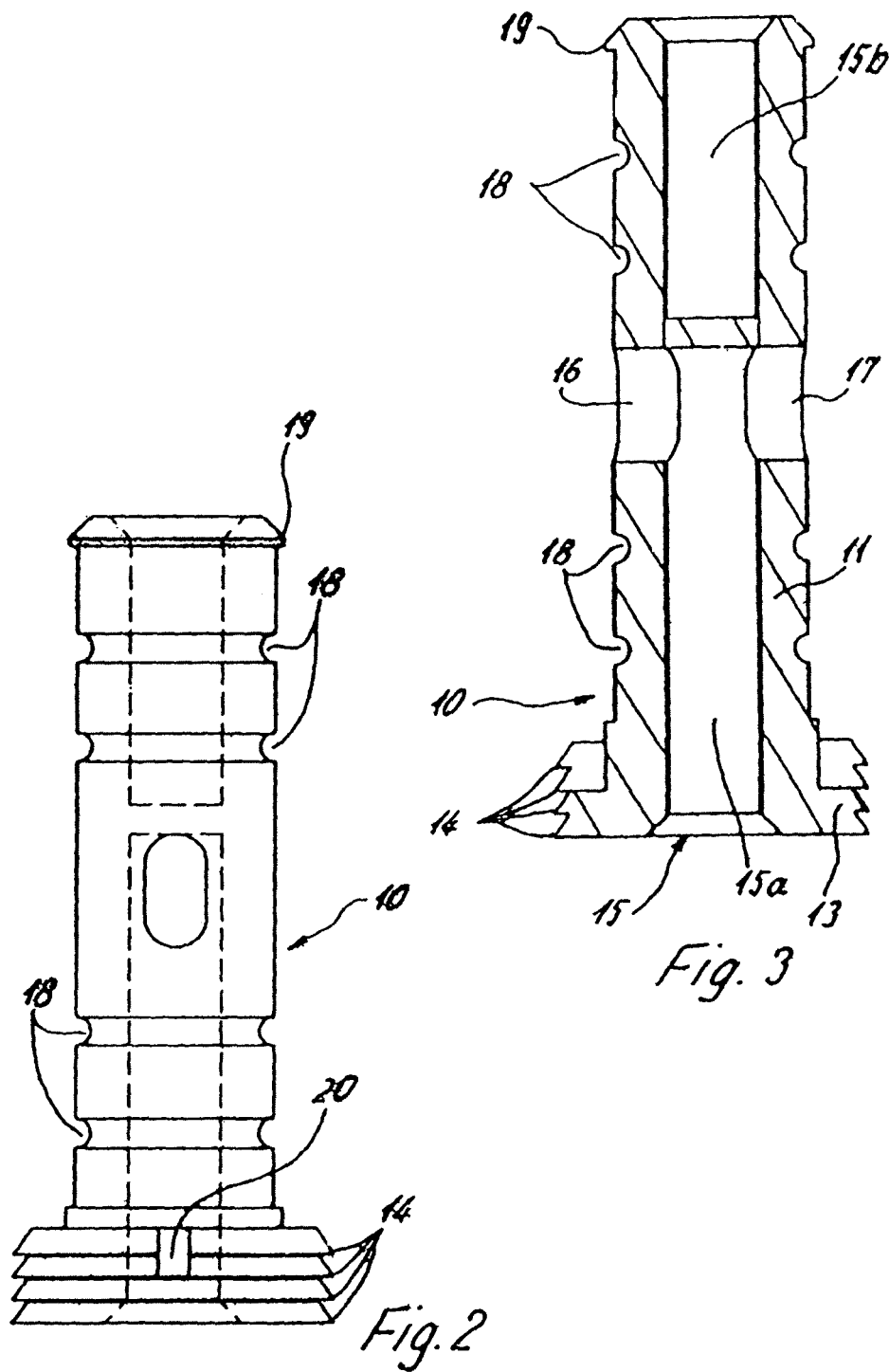

CONNECTION INSERT

This is a Divisional Application of Non-Provisional patent application Ser. No. 11/910,763, filed on Apr. 29, 2008, which claims priority to and benefit of Provisional Application No. 60/562,081, filed Apr. 14, 2004, the disclosures of both applications being incorporated by reference herein. Application Ser. No. 11/910,763 is a §371 of PCT/EP2006/61394, filed on Apr. 6, 2006, which claims benefit of German Application Number 20 2005 005 579.4 filed on Apr. 7, 2005.

The invention relates to a connection insert and more specifically to a connection insert with adhesive supply channel.

This connection insert is used for the fastening of components to boards, these boards generally having a soft inner core and hard cover boards. These boards are generally called lightweight boards. The connection insert is provided with a central adhesive supply channel and with outlets for the adhesive which are perpendicular to the channel. In a construction, the above-mentioned board-shaped components are used, among other uses, for the production of furniture. The connection inserts are used for guiding the adhesive such that it reaches the connection inserts and the latter form a fixed connection with the fixed regions of the boards. However, it is also conceivable that the end regions of the connection inserts are inserted into boreholes or recesses of the board-shaped components so that they support the adhesive connection.

It is a disadvantage of the previously known connection inserts that the guiding of the adhesive is not precisely defined, so that it frequently happens that the adhesive does not arrive at the point where the actual adhesive connection is to take place. However, a precise guidance is required because adhesives are considered to be semi-fluidic; that is, their viscosity is relatively high.

It is an object of the disclosure to design a connection insert of the initially described type such that a precise guidance of the injected adhesive is ensured, so that the adhesive connections take place at the defined locations.

This object is achieved in that the connection insert consists of a plurality of parts and comprises an inner part having the adhesive supply channel and an outer sleeve enveloping the inner part.

The adhesive is placed in the connection insert by means of a suitable device from a front side. The outside surface of the inner part and the inside surface of the outer sleeve may be designed such that a targeted adhesive guidance is feasible. In particular, depending on the usage of the connection insert, the outer sleeve can be designed such that targeted adhesive connections are achieved. Since it causes the distribution of the adhesive, it could also be called a distributor sleeve or an adhesive guiding sleeve.

In the simplest construction, the connection insert consists exclusively of the inner part and the outer sleeve. An annular gap is arranged between the inside surface of the outer sleeve and the outside surface of the inner part.

For reinforcing the adhesive connection between the connection insert and the adjacent component, for example, to a board, the inner part has a head at least at one end, which head can at least partially form-lockingly and/or force-lockingly be inserted in a borehole or in a recess of the component. The connection of the head of the inner part with the component can take place in a particularly simple manner. The circumferential surface of the head is profiled such that the raised parts mold themselves into the material bounding the borehole or the recess. This becomes possible because the concerned components consist of wood or a wood-like material. The profiling of the circumferential surface can be formed by harpoon-type webs, so that the inner part can be pressed in one direction into the borehole or into the recess, but that a pulling-out in the opposite direction is possible only by destroying the material parts bounding the borehole or the recess. The mutually spaced harpoon-type webs may be shaped in a surrounding manner to the head of the inner part; they may also extend over certain partial regions of the circumference; or the may extend in the direction of the longitudinal center axis of the inner part, so that an antitwist protection is correspondingly provided in the last embodiment.

For gluing the head of the inner part to the surfaces bounding the borehole or the recess, the head of the inner part is equipped with at least one, for example two diametrically opposite adhesive outlet opening(s). The adhesive outlet opening or openings is/are expediently designed in a slot shape as well as extending in the direction of the longitudinal axis of the inner part.

In order to also permit the gluing-together over the entire length of the shaft of the inner part, the inner part has several mutually spaced circumferential grooves on the circumferential surface. So that adhesive can also penetrate into these circumferential grooves, the inner part outside the head has at least one adhesive outlet opening, preferably with two mutually diametrically opposite adhesive outlet openings. Through each adhesive outlet opening, the adhesive can then arrive in the annular gap between the outside surface of the inner part and the inside surface of the outer sleeve. So that the adhesive can also arrive in the end regions of the shaft of the inner part, each adhesive outlet opening is arranged in the central region of the shaft.

The adhesive can be pressed into the adhesive supply channel of the inner part only from a front side. So that the quantity of the adhesive remaining in this channel is limited, the adhesive supply channel is divided into two sections, and that only one section extends into the region of the adhesive outlet openings. For securing the outer sleeve, the inner part is equipped with a locking ring on the side facing away from the head. The locking ring is designed such that such a deformation takes place as a result of the effect of a compression force. Thus, the outer sleeve can be placed upside down onto the inner part. In addition, a lateral distribution of the adhesive takes place. So that the adhesive can be distributed over the entire length or height of the shaft of the inner part and also over the inside surface of the outer part, the inside surface of the outer sleeve is constructed as a profiling which is formed of indentations and elevations extending in the longitudinal direction. In other words, the elevations and indentations extend transversely to the circumferential grooves of the shaft of the inner part.

In addition, in the end region facing the head of the inner part, the outer sleeve is provided with several slots in order to facilitate the joining or the snapping-together of the inner part with the outer sleeve. Furthermore, when adhesive is supplied, the latter emerges from the slots, which has a positive influence on the adhesive connection.

The adhesive supply normally takes place under pressure. Particularly the outer sleeve could be called an adhesive guiding element so that the adhesive is pressed into the end regions in a targeted manner. After a reduction of the supply pressure, the adhesive could flow back into the central region of the outer sleeve. In order to prevent this, the outer sleeve is equipped with flexible retaining elements for the adhesive on the outside surface at least in the end regions. These retaining elements are designed such that they form a corresponding abutment. The retaining elements may be arranged in different fashions. Thus, they extend radially or tangentially with respect to the outside surface of the outer sleeve in the end regions facing the outside surface of the outer sleeve. Although it is sufficient for the retaining elements to be arranged in the end regions, in another embodiment, they are arranged radially with respect to the longitudinal center axis of the outer sleeve and extend over the entire length or almost the entire length of the outer sleeve. In this case, the lengths of the retaining elements increase from the center region to the end regions of the outer sleeve, for example in a continuous manner. As a result, analogously an outer contour is created relative to the longitudinal section, which can be considered to be concave. The retaining elements are expediently constructed as bristles, strips or the like.

It is also provided that the adhesive supply channel has a sieve or a perforated plate in the end region. This proportions the adhesive quantity and prevents that impurities penetrate into the adhesive supply channel. Depending on the usage, it may also be expedient to provide the outer sleeve with several openings, which are circular or have a configuration deviating from the circular shape.

The range of applications of the connection insert is diverse. Thus, the outer and the inner part each have a cup-shaped construction, and the connection insert can be fixed to a furniture component or a furniture leaf by a generally known eccentric fitting.

The connection insert may be called a dowel in order to fasten fittings or the like, for example, by a screw.

The connection insert will be explained in greater detail by means of the attached drawings.

BRIEF DESCRIPTION OF THE DRAWINGS

FIG. 2 is a front view of the inner part;

FIG. 3 is a sectional view of the inner part;

DETAILED DESCRIPTION OF THE EMBODIMENTS

Figure 1:
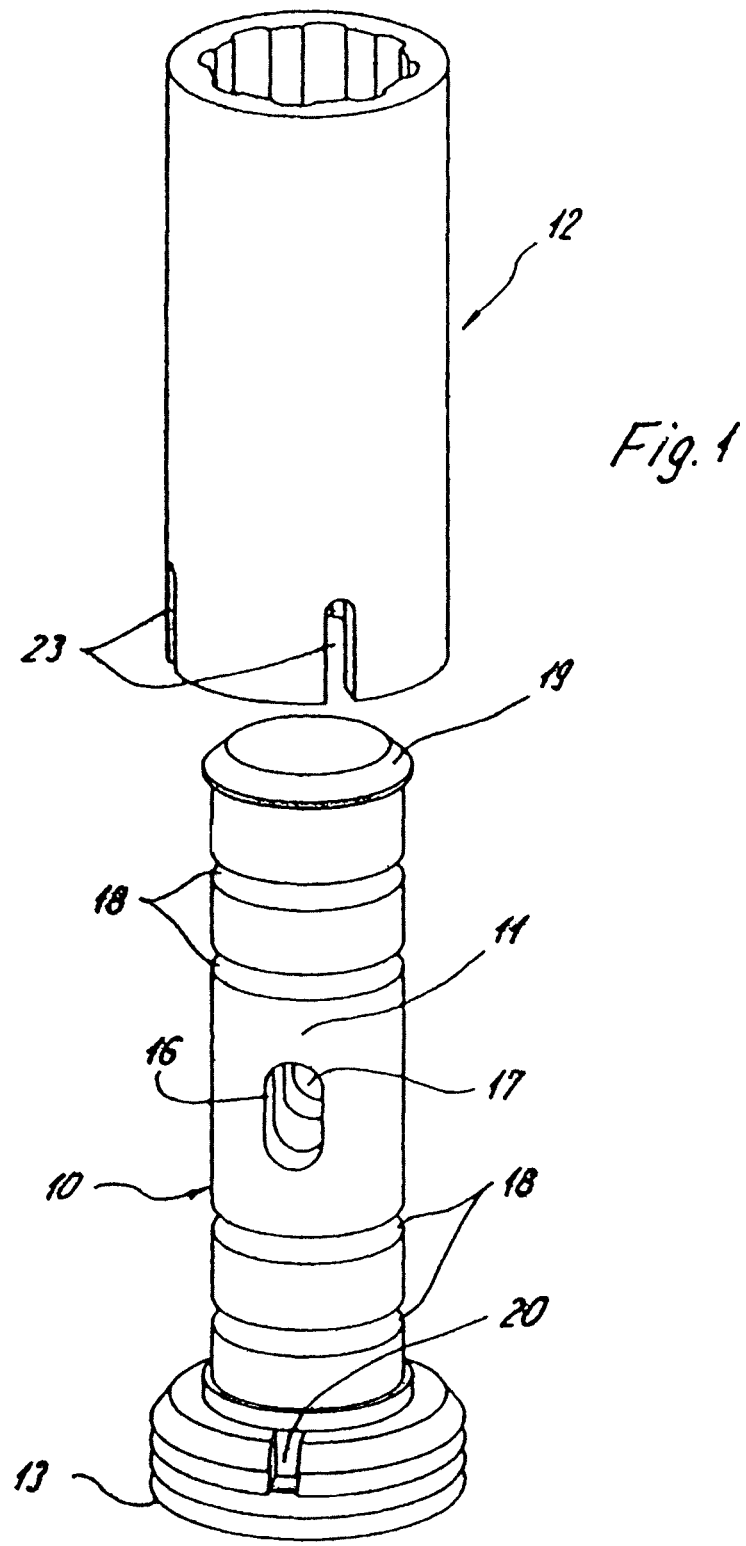
FIG. 1 is an exploded as well as perspective view of the inner part and the outer sleeve of a connection insert of the present disclosure as a detail.

The connection insert illustrated in FIGS. 1 to 7 consists of an inner part 10, which will be explained in detail, and of an outer sleeve 12, which can be fitted onto a shaft 11 of the inner part 10 and will also be explained in detail. At one end, the inner part 10 is also equipped with a head 13 whose circumferential surface is profiled. This profiling consists of several harpoon-type webs 14, as illustrated particularly in FIGS. 2 and 3. The inner part 10 is provided with an adhesive supply channel 15 consisting of two sections 15a and 15b. As illustrated particularly in FIG. 3, the two sections 15a, 15b of the adhesive supply channel 15 are mutually separated by a wall. In addition, the tube-shaped inner part 10 is provided with two mutually diametrically opposite adhesive outlet openings 16, 17. These are designed as oblong holes and are arranged such that only adhesive can penetrate from section 15a to the outside.

As shown in FIGS. 1 to 3, the shaft 11 of the inner part 10 also has several circumferential grooves 18 on the exterior side and are spaced with respect to one another. The figures also illustrate that the inner part 10 is equipped with a locking ring 19 on the side situated opposite the head 13. When the outer sleeve 12 fitted onto the shaft 11, the locking ring extends beyond the outer sleeve and prevents separation of the inner part 10 and the outer sleeve 12. This outer sleeve 12 can be deformed because of the form-elastic and material-elastic characteristics of plastic materials, so that the outer sleeve 12 can be placed upside down onto the inner part 10.

As illustrated by FIGS. 1 and 2, in the region of the head 13, the inner part 10 is also provided with two mutually diametrically opposite, slot-type openings 20 through which adhesive emerges for the gluing of the head 13 to the elements it is inserted into.

Figure 5:
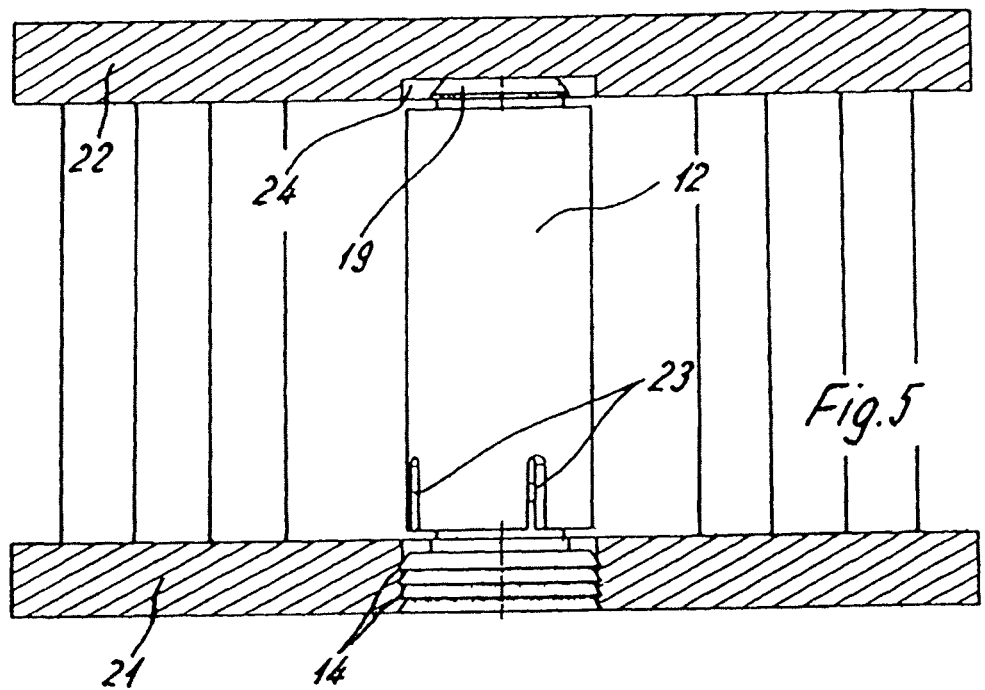
FIG. 5 is a view of a second embodiment of a connection insert arranged between two cover layers.
Figure 4:
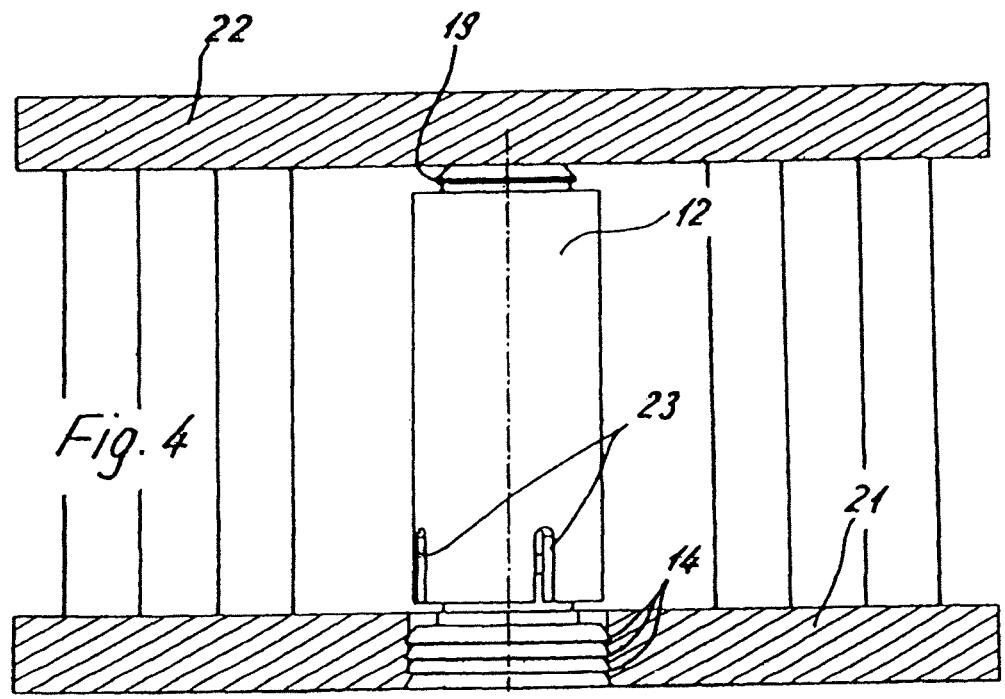
FIG. 4 is a view of a first embodiment of a connection insert arranged between two cover layers.
Figure 6:
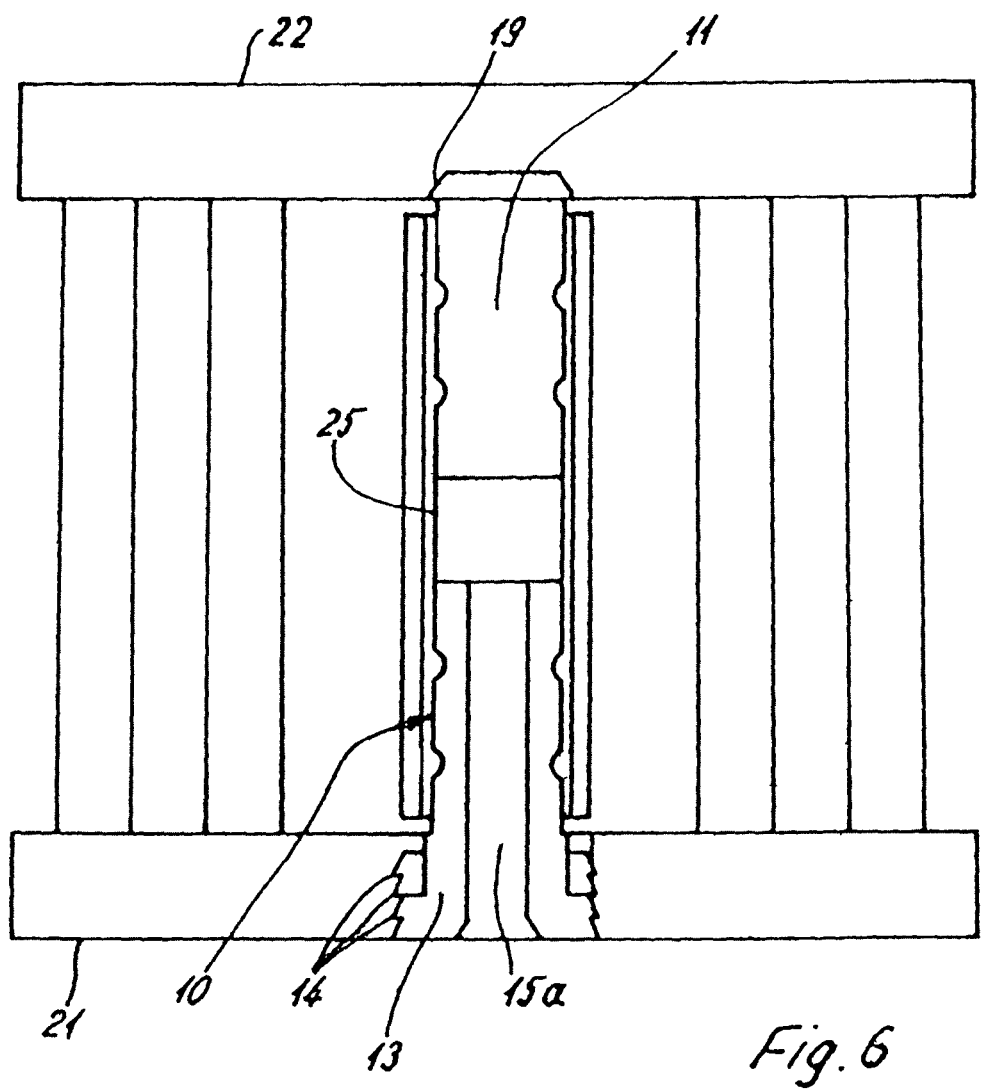
FIG. 6 is a cut-away view of the connection insert arranged between two spaced cover layers of the boards.

FIGS. 4 to 6 show the arrangements of a lightweight board with the cover layers 21, 22 and a connection insert arranged in-between. For this purpose, the outer sleeve 12 is pushed onto the shaft 11 of the inner part 10. The adhesive can then be pressed into the section 15a of the adhesive supply channel 15, penetrates the radial adhesive outlet openings 16, 17 and is then distributed into the annular gap 25 between the inside surface of the outer sleeve 12 and the outside surface of the shaft 11. Slots arranged in an end region of the outer sleeve 12 ensure the exiting of the adhesive which thereby comes in contact with the cover layers of the lightweight boards in a targeted manner. For locking the outer sleeve 12 with the shaft 11, the outer sleeve 12 is provided with slots 23 extending in the longitudinal direction on the side assigned to the head 13 of the inner part 10.

In the embodiment according FIG. 4, the locking ring 19 is supported on the assigned surface of the cover layer 22, while, in the embodiment according to FIG. 5, the cover layer 22 is provided with a recess 24 in which the locking ring 19 engages. FIGS. 4 and 5 illustrate that the harpoon webs 14 of the head 13 pit or dig into the material of the cover layer 21 bounding the borehole. In addition, the securing also takes place by gluing.

FIG. 6 shows the arrangements according to FIGS. 4 and 5 in the cut-away condition. This figure illustrates that an annular gap 25 is formed between the outside surface of the shaft 11 and the inside surface of the outer sleeve 12, the adhesive running in this annular gap 25 and being deposited on the interior sides of the cover layers 21, 22.

Figure 7:
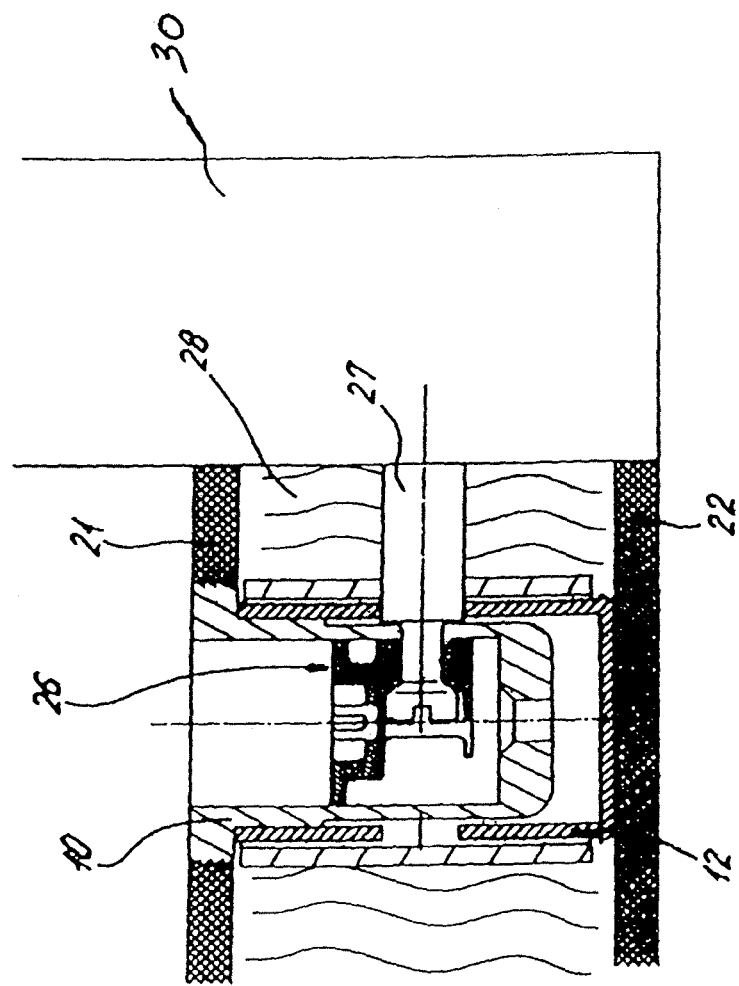
FIG. 7 is a view of the connection insert according to the present disclosure in combination with an eccentric fitting.

FIG. 7 shows a variant for fixing a corner connection fitting in a lightweight board. The inner part 10 and the outer sleeve 12 each have a cup-shaped construction. The adhesive guidance is analogous to the descriptions of FIGS. 1 to 6 and is not shown in detail. In addition, the bracing takes place by an eccentric fitting 26, which is generally known. Also, a dowel 27 is inserted in a borehole of a board 28 which, in turn, is fixed in another component 30.

Figure 8:
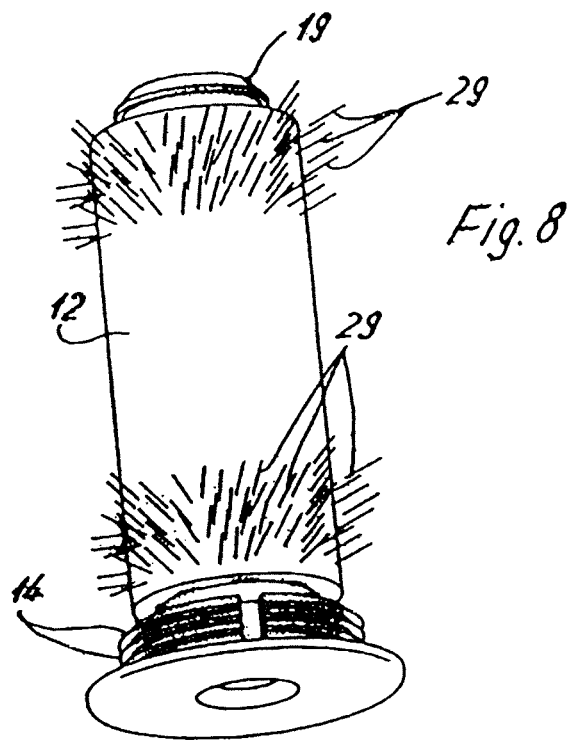
FIGS. 8 to 10 are views of three different embodiments of the connection insert equipped with retaining elements.
Figure 9:
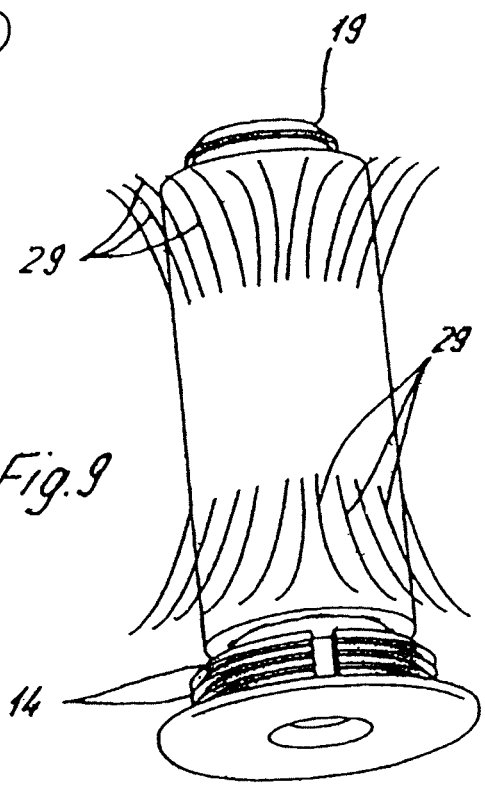
Figure 10:
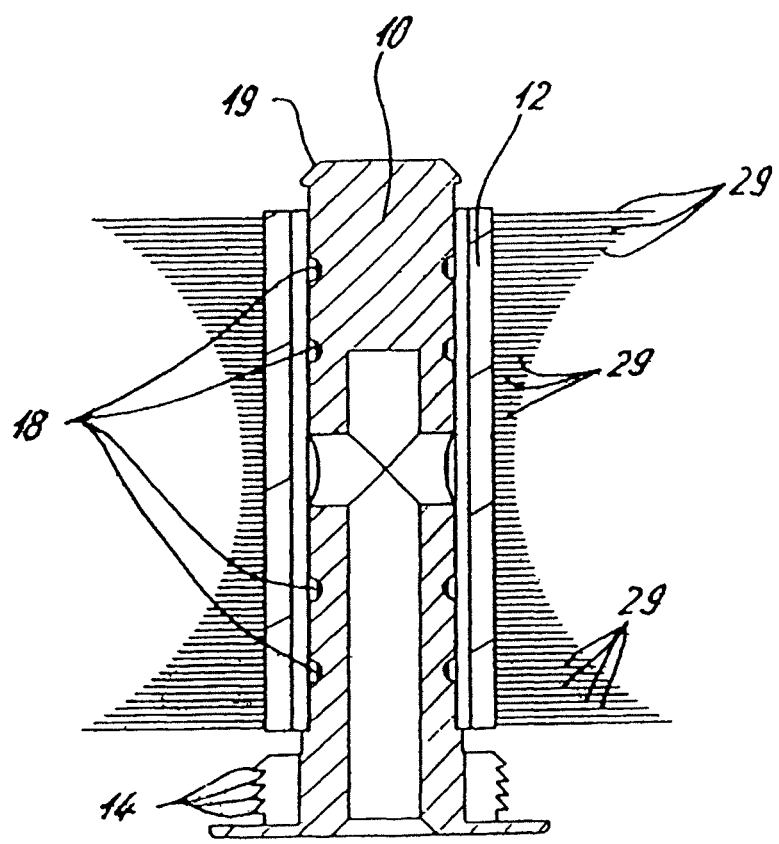

FIGS. 8 to 10 show embodiments, in which retaining elements 29 in the form of bristles, strips or the like are placed on the outside surface of the outer sleeve 12. The figures show that the adhesive is pressed by pressure into the end regions of the outer sleeve 12. After the reduction of this pressure, the adhesive could flow back, although only partially and only by a relatively small amount. In order to prevent this, essentially radially extending retaining elements 29 are placed in the end regions of the outer sleeve 12 in the embodiment according to FIG. 8. Also in the embodiment according to FIG. 9, the retaining elements 29 are fixed in the end regions. In this embodiment, at least the end regions facing the outside surface of the outer sleeve 12 extend tangentially or approximately tangentially.

In the embodiment according to FIG. 10, the retaining elements 29 are essentially distributed over the entire length and also over the entire circumference of the outer sleeve 12. They are again disposed radially with respect to the longitudinal center axis of the outer sleeve 12. However, in a longitudinal sectional view, a concave shape of the outer contour is obtained because the lengths of the retaining elements 29 increase continuously from the center region to the end regions. The retaining elements 29 may be bristles consisting, for example, of a plastic material.

Figure 11:
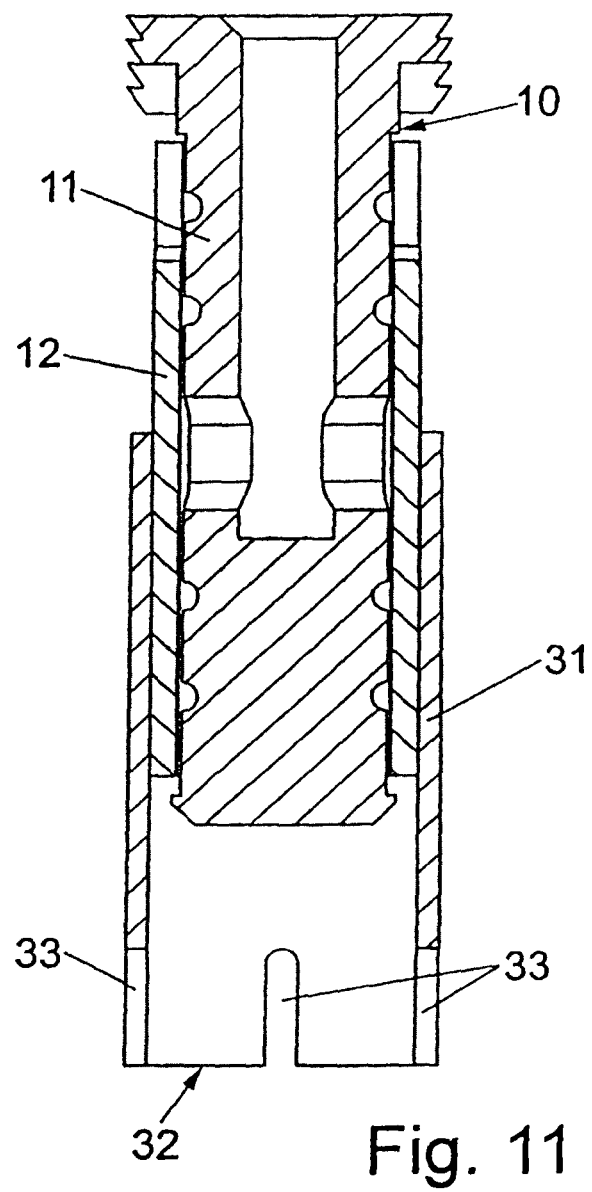
FIG. 11 is a sectional view of a connection insert according to another embodiment.

FIG. 11 shows an embodiment in which, in contrast to the previously described constructions, the effective length of the connection insert can be changed.

This is achieved by an extension sleeve 31 which is telescopically displaceably fitted over the outer sleeve 12. The remaining construction of the connection insert according to FIG. 11 basically corresponds to the previously described variants; that is, the above-mentioned outer sleeve 12 is placed on the shaft 11 of an inner part 10 having an adhesive supply channel 15.

As mentioned above, the telescopically displaceable extension sleeve 31 is pushed into this outer sleeve 12. The extension sleeve 31 can be displaced relative to the outer sleeve 12 in the axial direction of the entire arrangement, whereby the overall length of the connection insert can be changed in a simple manner and can be adapted to different thicknesses of lightweight boards.

At its free front-side end 32, the extension sleeve 31 is provided with axially extending slots 33 through which adhesive can penetrate toward the outside.

Deviating therefrom, the extension sleeve 31 may be provided with adhesive outlet boreholes in the front-side region. It is also conceivable to construct the face of the extension sleeve 31 in a wavy shape or to provide it with radial serrations in order to permit an exiting of adhesive.

The connection insert is not limited to the illustrated embodiments. It is essential that the connection insert is constructed of several parts, preferably two parts, and is formed of the inner part 10 and the outer sleeve 12. Furthermore, it is important that the guiding of the adhesive is precisely defined by the adhesive supply channel 15, by the adhesive outlet openings 16, 17, by the radial grooves 18 and by the annular gap 25.

Although the present disclosure has been described and illustrated in detail, it is to be clearly understood that this is done by way of illustration and example only and is not to be taken by way of limitation. The scope of the present disclosure is to be limited only by the terms of the appended claims.

The invention claimed is:

1. A connection insert for a component comprising: an inner part having a central adhesive supply channel therein and an outlet opening connected to and disposed transverse to the supply channel; and a separate outer sleeve concentric to the inner part which can be at least partially inserted into a borehole of the component;
   wherein, on an outside surface, the outer sleeve includes at least in the end regions flexible retaining elements for the adhesive; and
   wherein the retaining elements extend in the end regions facing the outside surface of the outer sleeve in one of radially and tangentially with respect to the outside surface of the outer sleeve.

2. The connection insert according to claim 1, including an annular gap between an inside surface of the outer sleeve and an outside surface of the inner part.

3. A connection insert for a component comprising: an inner part having a central adhesive supply channel therein and an outlet opening connected to and disposed transverse to the supply channel; and a separate outer sleeve concentric to the inner part which can be at least partially inserted into a borehole of the component;
   wherein, on an outside surface, the outer sleeve includes at least in the end regions flexible retaining elements for the adhesive; and
   wherein the retaining elements are arranged radially with respect to a longitudinal center axis of the outer sleeve and extend over substantially the entire length and over the entire circumference.

4. The connection insert according to claim 3, wherein the lengths of the retaining elements increase, from the central region to the end regions of the outer sleeve.

5. A connection insert for a component comprising: an inner part having a central adhesive supply channel therein and an outlet opening connected to and disposed transverse to the supply channel; and a separate outer sleeve concentric to the inner part which can be at least partially inserted into a borehole of the component;
   wherein, on an outside surface, the outer sleeve includes at least in the end regions flexible retaining elements for the adhesive; and
   wherein the retaining elements are constructed as one of bristles, strips and the like and are distributed over the respective region along the entire circumference.

6. A connection insert for a component comprising: an inner part having a central adhesive supply channel therein and an outlet opening connected to and disposed transverse to the supply channel; and a separate outer sleeve concentric to the inner part which can be at least partially inserted into a borehole of the component; and
   wherein the inner part and the outer sleeve each have a cup-shaped construction, and in that the connection insert formed thereof can be fixed to a component by an eccentric fitting.

7. A connection insert for a component comprising: an inner part having a central adhesive supply channel therein and an outlet opening connected to and disposed transverse to the supply channel; and a separate outer sleeve concentric to the inner part which can be at least partially inserted into a borehole of the component; and
   including an extension sleeve, which can be telescopically displaced with respect to the outer sleeve, is pushed onto the outer sleeve.

8. The connection insert according to claim 7, wherein in the region of its free front side, the extension sleeve includes one of having axially extending slots, having a wavy construction and having radial serrations.

* * * * *